(12) United States Patent
Descombes et al.

(10) Patent No.: US 7,988,576 B2
(45) Date of Patent: Aug. 2, 2011

(54) DISENGAGEABLE PULLEY DEVICE

(75) Inventors: Michel Descombes, Versailles (FR);
Pierre-Julien Barraud, Rochecorbon (FR); Virginie Hamada, Tours (FR); Régis Petit, Courcelles de Touraine (FR)

(73) Assignee: Aktiebolaget SKF, Gothenburg (SE)

( * ) Notice: Subject to any disclaimer, the term of this patent is extended or adjusted under 35 U.S.C. 154(b) by 678 days.

(21) Appl. No.: 12/054,962

(22) Filed: Mar. 25, 2008

(65) Prior Publication Data
US 2008/0248905 A1  Oct. 9, 2008

(51) Int. Cl.
*F16H 55/36* (2006.01)
(52) U.S. Cl. .................. 474/166; 474/112
(58) Field of Classification Search .......... 474/112, 474/160, 166, 174, 177, 178, 179, 180, 191, 474/54, 100, 13
See application file for complete search history.

(56) References Cited

U.S. PATENT DOCUMENTS

| | | | |
|---|---|---|---|
| 2,140,975 A | 12/1938 | Welch | |
| 4,018,318 A | 4/1977 | Hallerberg | |
| 7,758,459 B2 * | 7/2010 | Gaborel et al. | 474/112 |
| 2007/0074945 A1 * | 4/2007 | Ponson et al. | 192/41 A |

FOREIGN PATENT DOCUMENTS

| DE | 570710 | 2/1933 |
|---|---|---|
| FR | 2856759 | 12/2004 |

OTHER PUBLICATIONS

Search Report for FR 692165 issued Dec. 21, 2007.

* cited by examiner

*Primary Examiner* — William A Rivera
(74) *Attorney, Agent, or Firm* — Meyertons, Hood, Kivlin, Kowert & Goetzel, P.C.; Eric B. Meyertons

(57) ABSTRACT

The disengageable pulley device includes a pulley mounted on an internal transmission element, and a free wheel provided with a plurality of wedges and with a cage for the wedges, said free wheel being designed to provide one-way engagement between the pulley and the internal transmission element. The device includes an elastic connecting member provided with a first fixing part for fixing it to the internal transmission element, with a second fixing part for fixing it to the cage, and with a working part between said fixing parts, said working part being radially moveable relative to the internal transmission element and being adapted to exert a circumferential return force on the cage.

13 Claims, 7 Drawing Sheets

DISENGAGEABLE PULLEY DEVICE

BACKGROUND OF THE INVENTION

1. Field of the Invention

The present invention relates to free wheels. More specifically, the present invention relates to disengageable pulleys fitted with free wheels used for example in the drive pulleys of motor vehicle alternators.

2. Description of the Relevant Art

Disengageable pulleys fitted with free wheels are known per se and are coming into increasing use to solve the harmful effects of acyclical phenomena or sudden decelerations of the engine which occur in internal-combustion engines, especially at low engine speeds and more especially in diesel engines, the danger being that a drive belt connected to the engine via a crankshaft pulley may decelerate suddenly while a driven pulley, for example an alternator pulley, will tend, by inertia, to continue to rotate at the same speed.

If there is a rigid coupling between the crankshaft pulley and the alternator shaft, the belt will come under severe stresses when these instantaneous changes of speed take place.

Such changes of speed produce harmful effects such as abnormal fatigue of the belt, which may break, or slide over the pulley, or the portions of belt between the pulleys may vibrate.

To attenuate these phenomena, a free wheel has been incorporated between the driven pulley and the driven shaft to provide for a temporary decoupling of the pulley from the shaft in the event of sudden deceleration of said pulley.

Such a disengageable pulley is known particularly from document JP 2005-282856 and generally includes two rolling-contact bearings located on either side of the pulley and, between the two rolling-contact bearings, a free wheel provided with a plurality of wedge-type cams and a cage containing a plurality of windows to house said cams.

In order to limit the wear on these cams, that document has the holding cage fixed to the driven shaft in order to drive the cage and the shaft at the same angular velocity. In this way, when the pulley is in the disengaged position in which it operates as a free wheel, slip occurs only between the cams and a raceway, located inside the pulley, which is correctly lubricated by the centrifugal force tending to throw the lubricant out towards said raceway.

However, with such a pulley, the cage has no degree of angular freedom relative to the driven shaft. The applicant has observed that this can be detrimental to the reliability of operation of the free wheel owing in particular to the fact that it creates a risk of interference between the cams and the edges of the windows of the holding cage at the moment when the cams tilt over.

Also known, this time from document FR-A-2 856 759, is a disengageable pulley provided with two holding cages for the coaxial wedge cams in which the inner cage includes friction elements that come into contact with the driven shaft. The outer cage includes friction elements in the form of clips in contact with the pulley.

In a disengaged position or when free-wheeling, the frictional torque between the friction elements and the pulley tends to retard the inner cage relative to the outer cage. The edges of the windows formed in the inner cage thus come into contact with the wedge cams and tilt them over. The cams are thus no longer in contact with the driven shaft.

The problem with such a device is its use of two holding cages, one provided with friction elements in the form of clips, which increases the cost price of the device.

In addition, American U.S. Pat. No. 4,018,318 discloses a disengageable pulley provided with a wedge cam cage, a friction element in contact with the driven shaft, and a drive rod attached to the cage to turn the shaft through the friction element. The friction element is an open ring with radial elasticity to allow it to be fitted into a groove formed on the inner transmission element.

That pulley has the drawback that it uses two separate elements to turn the driven shaft with the cage. Moreover, given the frictional contact between the open ring and the driven shaft, under certain conditions of operation of the pulley the cage has no degree of angular freedom with respect to the driven shaft. The applicant has found that this can be detrimental to the pulley's reliability of operation.

SUMMARY OF THE INVENTION

Described herein are embodiments of a disengageable pulley that includes components that are cheap to make and cheap to assemble. Additionally the described embodiments relate to a disengageable pulley that has good reliability of operation.

The disengageable pulley device includes a pulley mounted on an internal transmission element, and a free wheel provided with a plurality of wedges and with a cage for the wedges, said free wheel being designed to provide one-way engagement between the pulley and the internal transmission element.

The device is also provided with an elastic connecting member provided with a first fixing part for fixing it to the internal transmission element, a second fixing part for fixing it to the cage, and a working part between the fixing parts. The working part is radially moveable relative to the internal transmission element and is designed to exert a circumferential return force on the cage.

The applicant has established the fact that the existence of an elastic connecting member fitted between the cage and the internal transmission element limits the slip between the wedges and the internal transmission element in a disengaged position of the free wheel, while allowing the cage to rotate slightly relative to the internal element, for example if the wedges push against the edges of the windows of said cage as they tilt over, in passing from the disengaged position to an engaged position or vice versa.

The reason for this is that, in the disengaged position, there is relative angular movement between the internal element and the cage. The working part of the elastic connecting member thus tends to tighten around the internal element and tends to drive the free wheel at the same speed as the internal element.

Consequently the relative slip between a raceway formed on the internal transmission element and the wedges is limited. The slip thus occurs essentially between the wedges and a raceway of the pulley that is thoroughly lubricated by the centrifugal effect. The slip therefore generates a weak retarding torque and very little wear on the wedges.

The applicant has furthermore found that with an elastic coupling member of this kind, the cage can rotate slightly relative to the internal element, for example if the wedges push against the windows of the cage as they tilt from the disengaged position to the engaged position or vice versa. This is made possible by the elasticity in the circumferential direction of the coupling member. This therefore avoids having the wedges impeded by the cage, or deterioration of the cage. This helps to ensure satisfactory operation of the free wheel.

The working part of the connecting member is advantageously situated at a distance from the internal transmission element in a rest position. Said working part preferably exerts a symmetrical circumferential return force.

In one embodiment, the working part of the connecting member is circumferentially continuous. It may radially encircle the internal transmission element.

In one embodiment, the working part of the connecting member includes at least one helical turn.

The first and second fixing parts may be situated in the same radial plane as each other.

In a first embodiment, the first part is mounted inside a hole formed in the internal transmission element. In a variant, the first fixing part includes at least one helical turn wound onto the internal transmission element.

In one embodiment, the second fixing part is fixed to a radial portion of the cage.

In one embodiment, the second fixing part is fixed to an axial portion of the cage.

The elastic connecting member is advantageously in the form of a double-wound spring with helical concentric turns. The direction in which the turns of the spring are wound is reversed at a loop connecting the two windings together.

The pulley advantageously includes a single cage for the wedges.

In one embodiment, the device additionally includes at least one elastic return element mounted between at least one wedge and the cage.

In one embodiment, the device includes at least two rolling-contact bearings, the free wheel being arranged axially between the bearings.

The disengageable pulley device can be mounted on an alternator shaft to drive said alternator. The pulley can be mounted on a central shaft via an intermediate free wheel, for example. The drive shaft can be mounted on the alternator shaft. A drive belt driven by the engine can pass around a perimeter of the pulley.

With the free wheel, the pulley drives the central shaft when the engine is accelerating or running at a generally continuous speed or very slowly decelerating. If the engine and therefore the pulley slow suddenly, the central shaft of the disengageable pulley device can continue to rotate faster than the actual pulley because of the presence of the free wheel, which thus protects the drive belt from excessive stresses.

The wedges tend to be kept in permanent contact with the raceways in an engaged position and in a disengaged position of the free wheel. This means in particular that the device is able to switch virtually instantaneously from a free-wheel position to a torque-transmitting position, and vice versa. The described disengageable pulley device also limits the wear on the wedges which slide mainly around the outer track of the pulley which is lubricated by centrifugal effect when the device turns.

BRIEF DESCRIPTION OF THE DRAWINGS

The present invention will be understood more clearly on reading the detailed description of certain embodiments taken by way of non-restrictive examples and illustrated in the accompanying drawings, in which.

Figure 1:
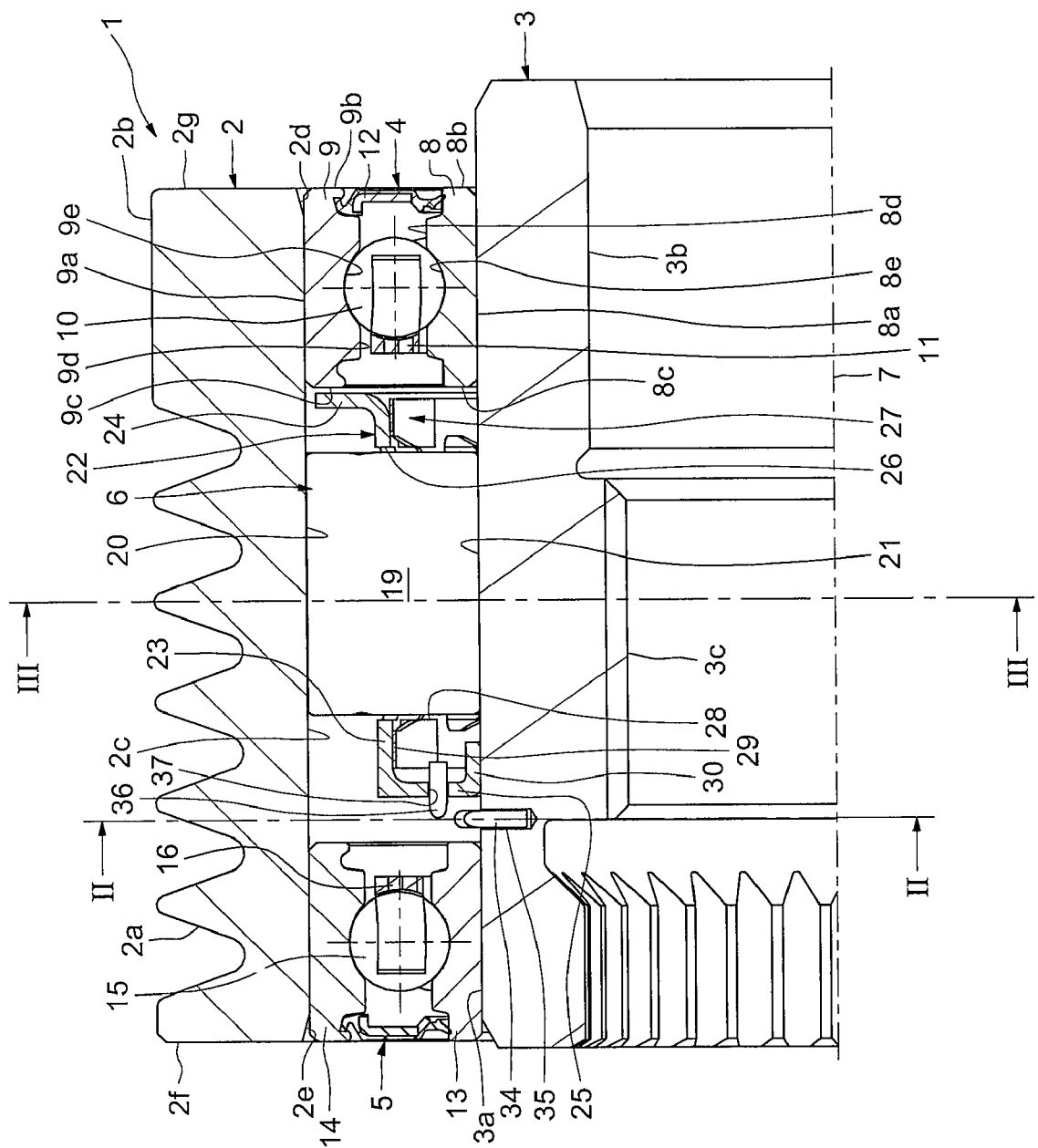
FIG. 1 is a half-view in axial section of a disengageable pulley device in a first embodiment.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
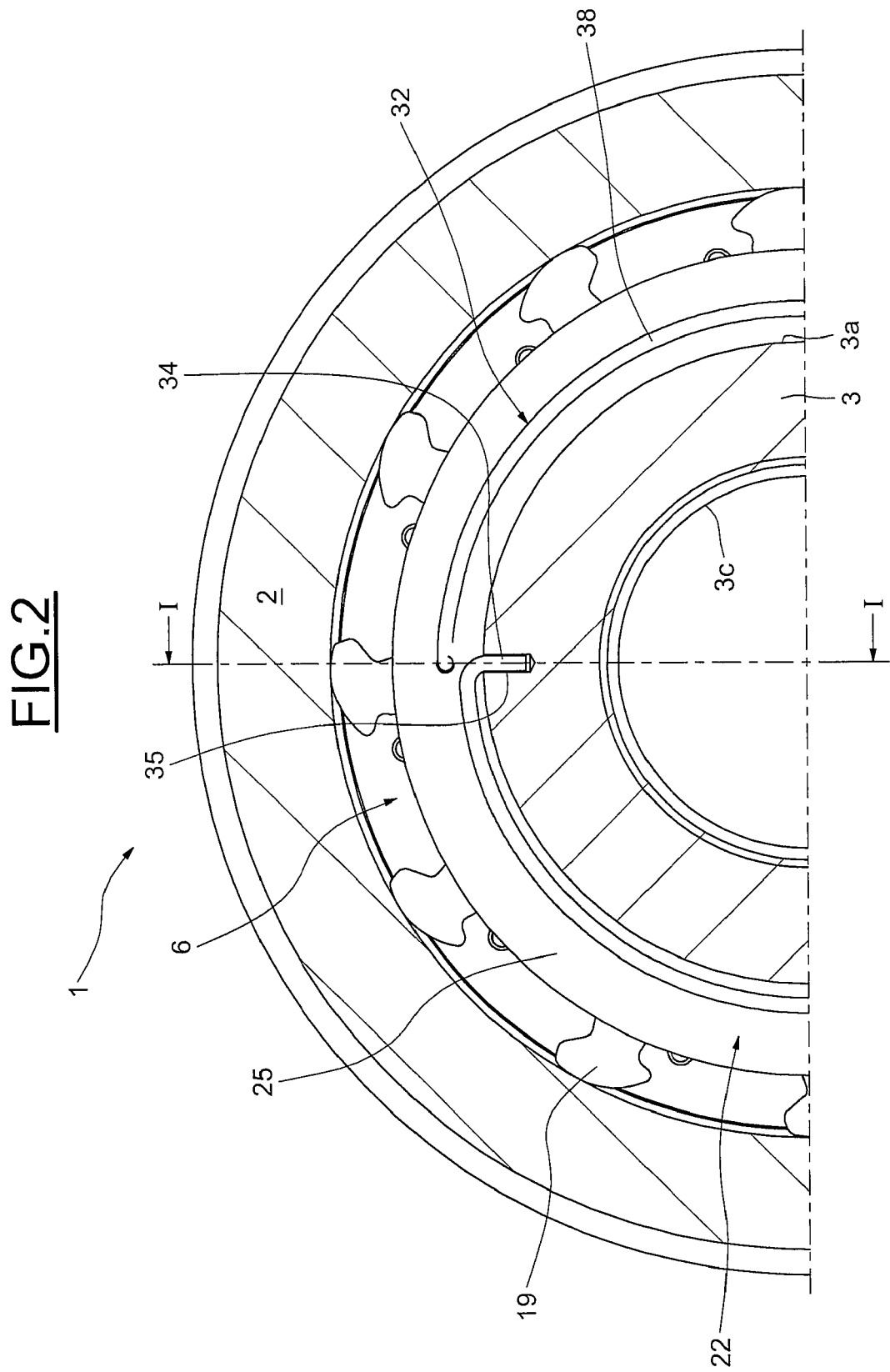
FIG. 2 is a half-view in section on the plane marked II-II in FIG. 1.
Figure 3:
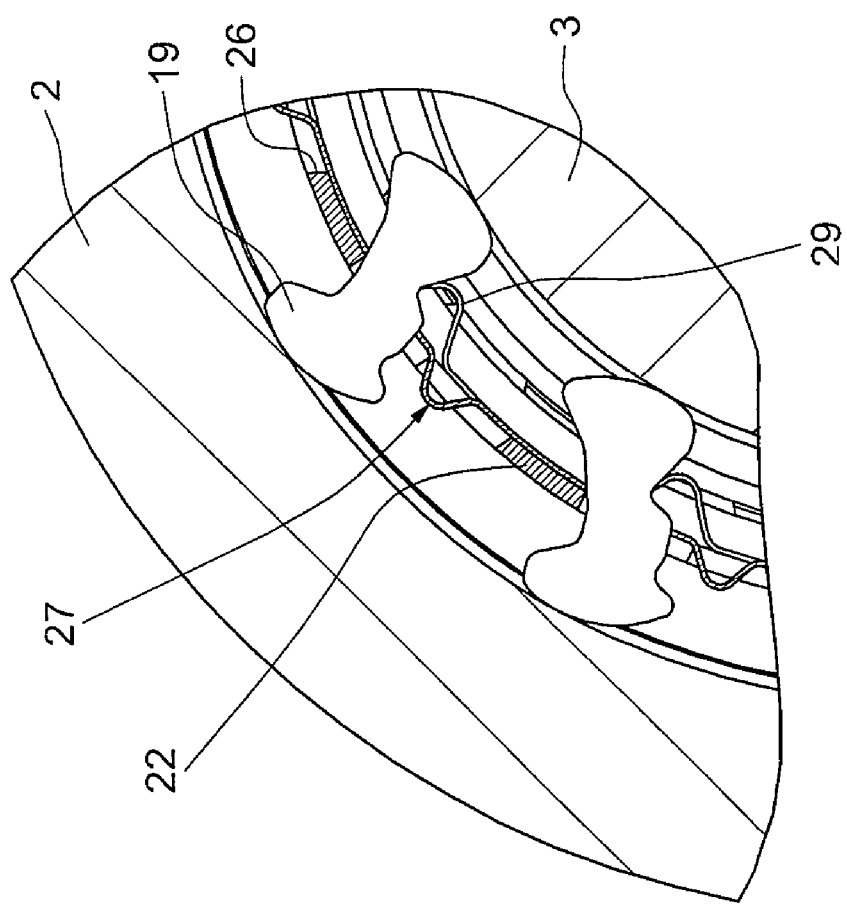
FIG. 3 is a partial view in section on the plane marked III-III in FIG. 1.

As can be seen in FIGS. 1 to 3, the disengageable pulley device 1 includes a pulley 2, an internal transmission element 3, such as a hollow shaft, two rolling-contact bearings 4 and 5, and a free wheel 6.

The pulley 2, of axis 7, has an outer surface provided with a grooved region 2a with annular grooves and an axial region 2b formed at an axial end of the grooved region 2a. The pulley 2 includes a cylindrical bore 2c extending through the entire length of the pulley 2, with the exception of chamfers 2d and 2e, each located at an axial end, and two radial end surfaces 2f and 2g.

The internal transmission element 3, which is in the form of a hollow shaft, has a cylindrical axial outer surface 3a on which a chamfer (not referenced) is provided at each axial end. The internal transmission element 3 also has a bore 3b, a part 3c of which is threaded so that it can be mounted on the end of an alternator shaft in order to drive said shaft (not shown).

The rolling-contact bearing 4, coaxial with the axis 7, includes an inner ring 8 and an outer ring 9, between which are housed a row of rolling elements 10 which in this case are balls; a cage 11 for maintaining the circumferential spacing of the rolling elements 10; and a seal 12.

The inner ring 8 includes a cylindrical bore 8a for fitting onto the outer surface 3a of the internal transmission element 3, and is bounded by two opposite radial lateral surfaces 8b and 8c and a stepped cylindrical outer surface 8d in which there is formed a circular channel 8e whose right cross section forms a concave inward profile suitable as a raceway for the rolling elements 10, said channel being outward-facing.

The outer ring 9 includes an outer cylindrical surface 9a for fitting into the bore 2c of the pulley 2 and is bounded by end surfaces 9b and 9c, and a stepped cylindrical bore 9d in which there is formed a circular channel 9e whose right cross section forms a concave inward profile suitable as a raceway for the rolling elements 10, said raceway being inward-facing. The bore 9d here includes two annular grooves (not referenced) which are symmetrical with each other about a plane passing through the centre of the rolling elements 10. The seal 12 is fitted in the annular groove situated on the outward side of the rolling-contact bearing 4 and rubs against the cylindrical outer surface 8d of the inner ring 8 to prevent leaks. The seal 12 is positioned radially between the inner and outer rings 8, 9, and mounted axially between the rolling elements 10 and the radial surfaces 8b and 9b of the rings 8 and 9. Said surfaces are axially flush with the radial end surface 2g of the pulley 2.

Similarly, the rolling-contact bearing 5, which is coaxial with the axis 7, includes an inner ring 13 fitted onto the outer surface 3a of the internal transmission element 3 and an outer ring 14 fitted into the bore 2c of the pulley 2, between which rings are housed a row of rolling elements 15, which in this case are balls; a cage 16 for maintaining the circumferential spacing between the rolling elements 15; and a metal seal 17. The rolling-contact bearing 5 is identical to the rolling-contact bearing 4, and is arranged symmetrically with respect to the latter about a radial plane passing through the centre of the pulley 2. The rolling-contact bearing 5 is thus axially flush with the radial end surface 2f of the pulley 2.

The rolling-contact bearings 4 and 5 are therefore located at each axial end of the pulley 2, with the free wheel 6 mounted axially between them. The free wheel 6 thus benefits from protection against intrusion of foreign bodies through the rolling-contact bearings 4 and 5, and in particular through the seals 12 and 17.

The free wheel 6 includes a plurality of wedges or cams 19 positioned between two raceways 20 and 21 which are cylinders of revolution. The cams 19 are of "engaging" type, that is to say they tend, when subjected to centrifugal forces when the free wheel is rotating, to tilt in the direction which causes them to wedge between the two raceways 20 and 21 so as to facilitate a virtually instantaneous transition from free-wheeling operation to torque-transmitting operation.

The raceway 20 is formed by the bore 2c of the pulley 2. The raceway 21 is formed by the axial outer surface 3a of the shaft 3.

In other words, the pulley 2 can be made with an inner surface whose shape is a very simple, entirely axial shape, except for the end chamfers 2d and 2e. The pulley 2 can therefore be manufactured inexpensively. This inner surface provides an outer bearing surface for the cams 19, or of large diameter.

The opposite raceway 21 is formed on the outer surface 3a of the shaft 3. The outer profile of revolution of the shaft 3 is of the same diameter all the way along its length. Finishing may be carried out in a single operation on a grinding machine so that the small-diameter raceway 21, or inner bearing surface, for the cams 19 of the free wheel 6 can be mass-produced inexpensively.

The free wheel 6 also includes a cage 22 of generally annular shape which may be made of a metallic material, typically steel, or from a synthetic material such as polyamide.

The cage 22 includes a large-diameter axial portion 23, two radial portions 24, 25 and a small-diameter axial centering part 30. The radial portion 24 is a radially outward continuation of an axial end of the portion 23 situated alongside the rolling-contact bearing 4, while the radial portion 25 is a radially inward continuation of an axial end of the portion 23 situated alongside the rolling-contact bearing 5, towards the outer surface 3a of the internal transmission element 3. The free end of the radial portion 24 is close to the bore 2c of the pulley 2. In other words, the radial portion 24 remains at a distance from the bore 2c.

The axial centering portion 30 is an axial continuation towards the cams 19 of the small-diameter end of the radial portion 25. The axial portion 30, of annular general shape, contacts the outer surface 3a of the internal transmission element 3 and locates the cage 22 centrally about it.

The cage 22 also includes a plurality of windows 26 formed in the axial portion 23 to house the cams 19. The windows 26 are spaced out regularly from each other in the circumferential direction. The cage 22 maintains a regular circumferential spacing of the cams 19.

The free wheel 6 also possesses a spring 27 which is in the form of an annular metal band which is wound about itself and connected end-to-end or with partial overlapping of the ends. The spring 27 is mounted inside the cage 22, and more particularly located radially between the outer surface 3a of the transmission element 3 and the axial portion 23 of the cage 22. The spring 27 is situated axially between the radial portions 24 and 25 of the cage 22.

The spring 27 also has cells or windows 28 which correspond to those of the cage 22 to allow the cams 19 to be inserted. The windows 28 are thus circumferentially regularly spaced.

The spring 27 is also provided with at least one elastic return element 29 per cam 19 in the form of a band designed to bear on a surface formed for this purpose on the associated cam 19 in order to apply a tilting torque tending to keep the cams 19 in contact with the raceways 20 and 21. In a static position, the return elements 29 apply a force towards the pulley 2.

In a variant, an individual return element associated with each cam applies a force tending to maintain a permanent contact with the raceways 20 and 21. For example, for each cam 19, one elastic return spring could be fitted between the cam 19 and the cage 22.

To connect the cage 22 and the internal transmission element 3, the free wheel 6 includes an elastic connecting member 32. The connecting member 32 takes the form of a spring. It is provided with a first fixing part 34 mounted in a blind hole 35 extending radially in from the outer surface 3a of the internal transmission element 3, a second fixing part 36 extending axially and fixed in a recess 37 in the radial portion 25 of the cage 22, and a working part 38 connecting said first and second fixing parts 34, 36. The elastic connecting member 32 is made in one piece.

The working part 38 of the connecting member 32 takes the form of a single helical turn extending circumferentially from a projecting end of the first fixing part 34, all the way around the outer surface 3a of the element 3 to one end of the second fixing part 36. The working part 38 is located radially between the outer surface 3a of the internal transmission element 3 and the axial portion 23 of the cage 22, and axially between the radial portion 25 of said cage and the rolling-contact bearing 5.

The working part 38 is configured in such a way that the radial distance between said part and the outer surface 3a of the internal transmission element 3 increases from the first fixing part 34 to the second fixing part 36. In a rest position, the working part 38 of the connecting member 32 is not in contact with the outer surface 3a of the internal transmission element 3.

In other words, the working portion 38 of the elastic member 32 is circumferentially continuous and encircles the outer surface 3a of the internal transmission element 3 radially, leaving a radial gap between itself and said outer surface 3a, which here increases in the circumferential direction, beginning at the fixing part 34.

The free wheel 6 is lubricated by a lubricant, such as grease, deposited inside the pulley, between the two rolling-contact bearings 4 and 5.

The free wheel 6 works as follows. When the pulley 2 is turning at a steady speed or accelerating, the cams 19 tend, by contact with the raceways, to tilt in a first direction such as to cause the two raceways 20 and 21 to become locked relative to each other. The free wheel 6 is thus engaged and transmits a driving torque between the pulley 2 and the internal element 3. In these conditions there is no relative angular displacement between the internal transmission element 3 and the pulley 2.

By contrast, when the pulley 2 is decelerated rapidly, the cams 19 tend to tilt in a second direction, opposite the first direction, which unlocks or releases the cams 19, although they remain in contact with the raceways 20 and 21. The free wheel 6 thus no longer transmits torque and allows relative rotation of the pulley 2 with respect to the internal transmission element 3. The free wheel 6 thus provides a one-way coupling between the pulley 2 and the transmission element 3.

In this disengaged position there is therefore a relative angular velocity between the pulley 2 and the internal transmission element 3, with the speed of rotation of the internal element 3 being greater than that of the pulley 2. Consequently the working portion 38 of the elastic connecting member 32 moves radially inwards, wrapping itself around the outer surface 3a of the internal element 3 and tending to tighten itself around it, potentially eventually coming into contact with said outer surface 3a.

In this disengaged position, therefore, the connecting member 32 allows the internal transmission element 3 to drive the free wheel 6 at the same speed as itself via its cage 22.

The internal transmission element 3 and the cage 22 are elastically coupled in rotation, which prevents or limits the relative sliding in the circumferential direction between the raceway 21 formed on the internal transmission element 3 and the cams 19. Sliding occurs principally against the raceway 20 of the pulley 2. However, because the lubricant is being flung out centrifugally by the rotation of the device, the raceway 20 of the pulley 2 is thoroughly lubricated, and as a consequence the cams 19 are able to slide against said raceway with very little wear and without generating any significant frictional torque.

In other words, when the free wheel 6 is free-wheeling, the connecting member 32 moves radially inwards from its rest position, in which the working part 38 is at a distance from the outer surface 3a of the internal transmission element 3, to a working position in which said part 38 tends to wrap itself around the internal transmission element 3 and press against the outer surface 3a, thereby coupling the free wheel 6 rotationally to the internal element 3.

On return to the engaged position, the cams 19 once again turn the internal transmission element 3 and the pulley 2. There is therefore no longer any relative angular movement between them. Consequently, the working part 38 of the connecting member 32 applies a circumferential return force to the cage 22, causing the working portion 38 to move radially outwards from its working position to its rest position, in which it is at a distance from the outer surface 3a.

The working portion 38 of the connecting member 32 is moveable radially relative to the internal transmission element 3 between a position of maximum distance and a position of minimum distance, in which latter said working part 38 will cause the internal element 3 and the free wheel 6 to turn at the same speed of rotation. The return from the position of minimum distance to the position of maximum distance is effected by elastic return.

Additionally, the use of a connecting member 32 that is elastic in the circumferential direction and is designed to wrap itself in such a direction that, in the disengaged position, the working part 38 tends to grip the outer surface 3a, also enables the cage 22 to rotate slightly relative to the internal transmission element 3, in the case where for example the cams 19 push against the edges of the windows 26 as they tilt from the disengaged position to the engaged position, or back again.

The advantage of this is that, as the applicant has found, when in the wrapped position around the internal transmission element 3 during free-wheeling or disengaged operation, a portion of the working part 38 of the connecting member 32 tends to remain at a distance from said internal element. A slight angular movement of the cage 22 relative to the internal transmission element 3 thus remains possible when the cams 19 are tilting from the free-wheeling position to the torque-transmitting position.

As indicated earlier, in the torque-transmitting position, the working part 38 of the connecting member 32 is at a distance from the internal element 3. If therefore the cams 19 push against the edges of the windows 26 of the cage 22 when moving from the torque-transmitting position to the free-wheeling position, the working part 38 of the connecting element 32 can tighten itself towards the outer surface 3a, and the cage 22 can rotate relative to the internal transmission element 3.

Figure 4:
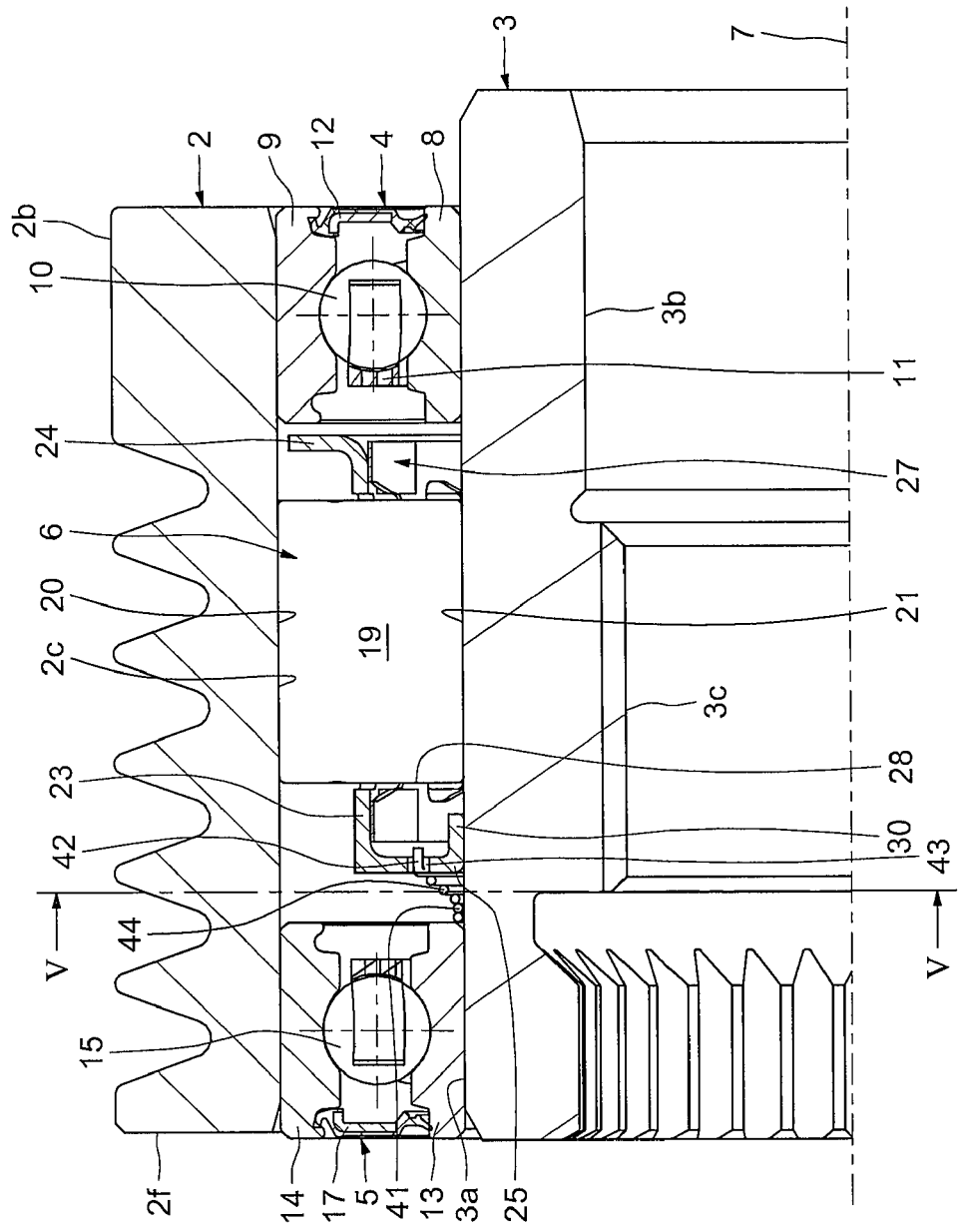
FIG. 4 is a half-view in axial section of a disengageable pulley device in a second embodiment.
Figure 5:
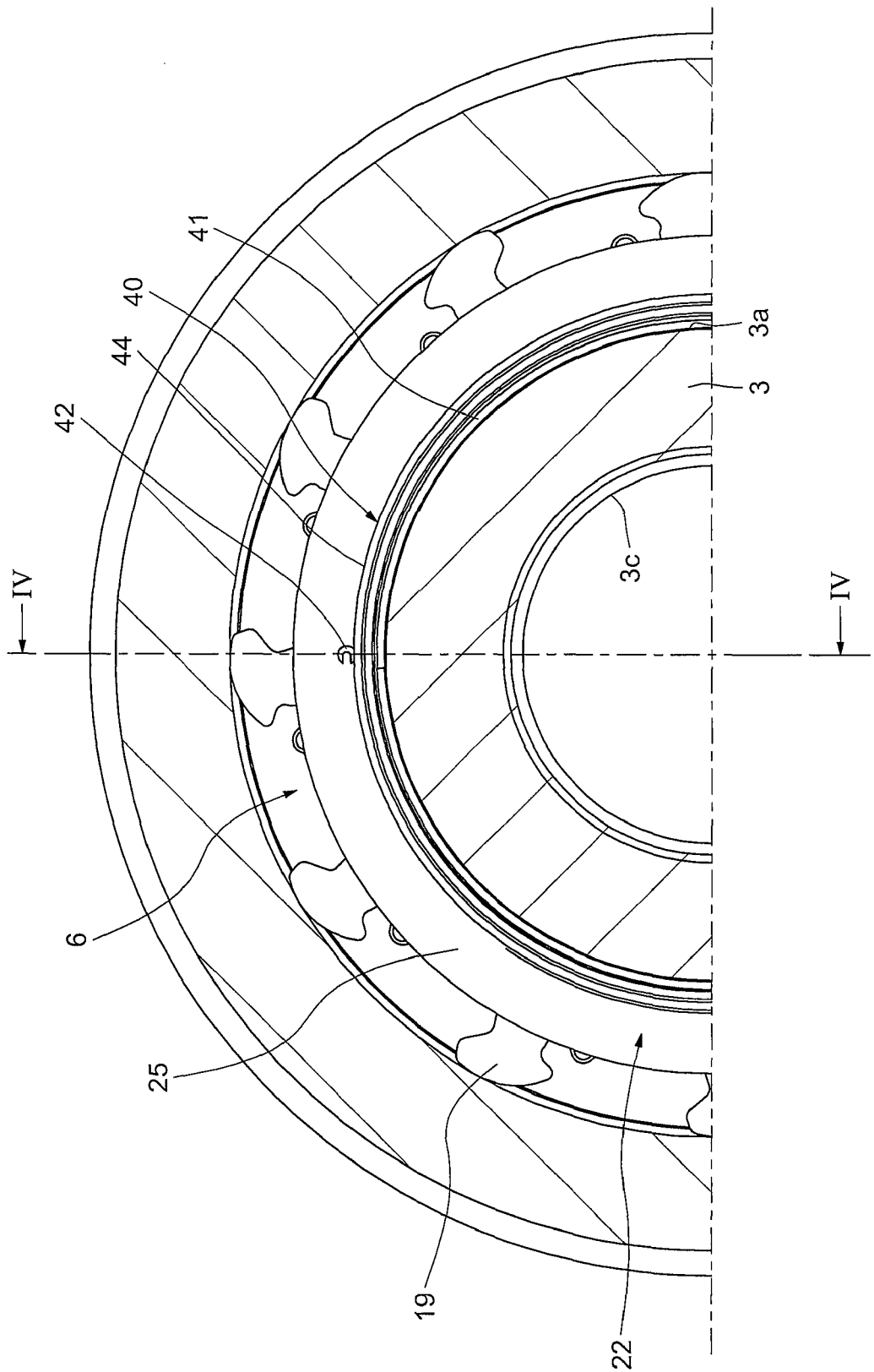
FIG. 5 is a half-view in section on the plane marked V-V in FIG. 4.

The embodiment illustrated in FIGS. 4 and 5, in which identical parts are given identical references, differs in that the free wheel 6 includes an elastic connecting member 40 provided with a first fixing part 41 in the form of a series of helical turns—three in the present case—fitted onto the outer surface 3a of the internal transmission element 3; a second fixing part 42 extending axially and mounted rigidly through a recess 43 in the axial portion 25 of the cage 22; and a working portion 44 connecting together said first and second fixing parts 41 and 42.

The working portion 44 here takes the form of two helical turns wrapped around the outer surface 3a of the internal transmission element 3 and tightened onto the latter in such a way that when there is relative angular movement between the internal transmission element 3 and the free wheel 6 when the pulley is free-wheeling, the helical turns of the working part 44 tend to grip said surface. The elastic member 40 is here made in one piece.

The working part 44 is configured in such a way that the radial distance between it and the outer surface 3a of the internal transmission element 3 increases from the first fixing part 41 to the second fixing part 42. In a rest position, the working part 44 of the connecting member 40 is situated at a distance from the outer surface 3a of the internal element 3.

The working portion 44 of the elastic member 40 is circumferentially continuous and radially encircles the outer surface 3a of the internal element 3, while leaving a radial space between it and said outer surface 3a, which increases in the circumferential direction, from the first fixing part 41 to the second fixing part 42.

Figure 6:
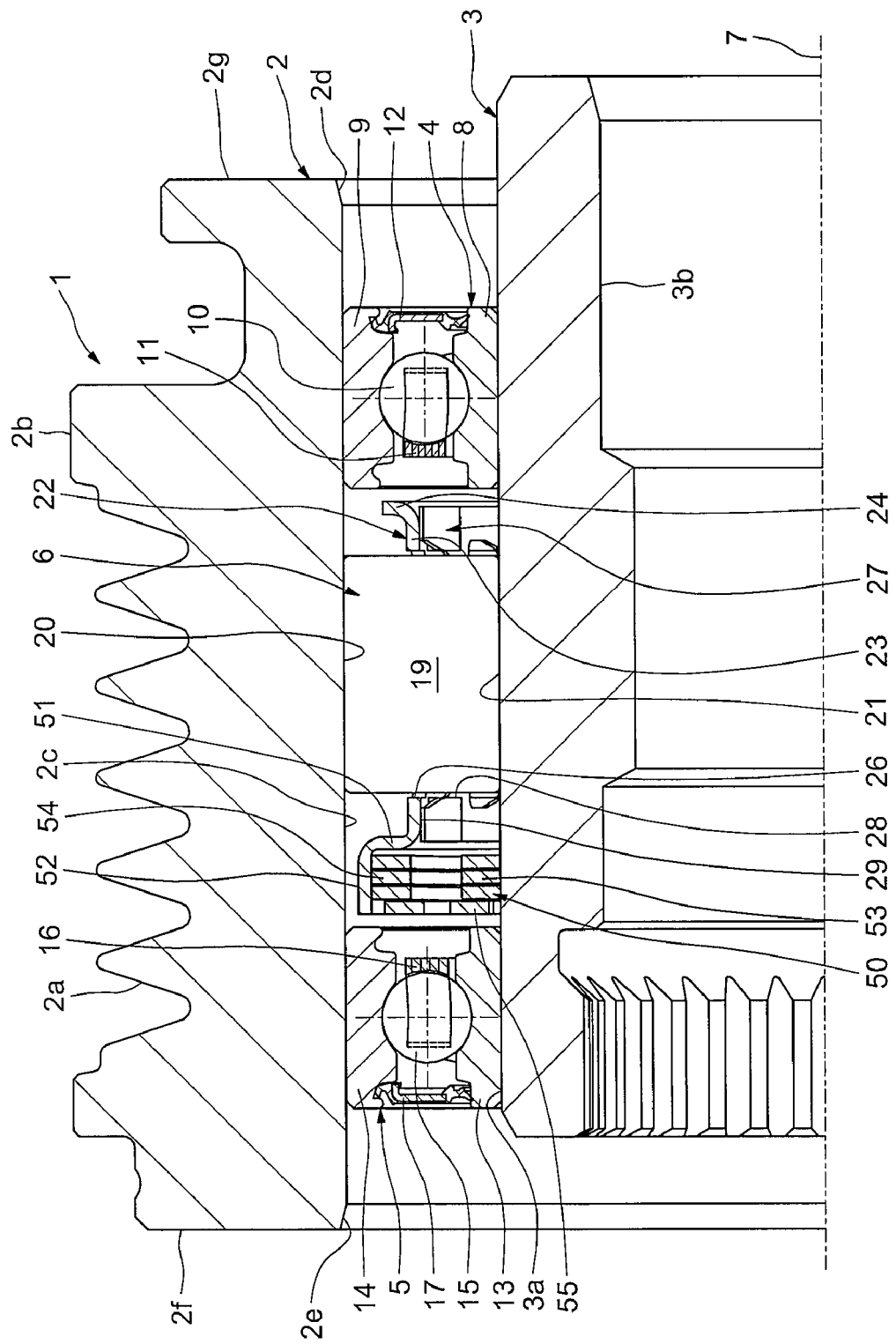
FIG. 6 is a half-view in axial section of a disengageable pulley device in a third embodiment.
Figure 7:
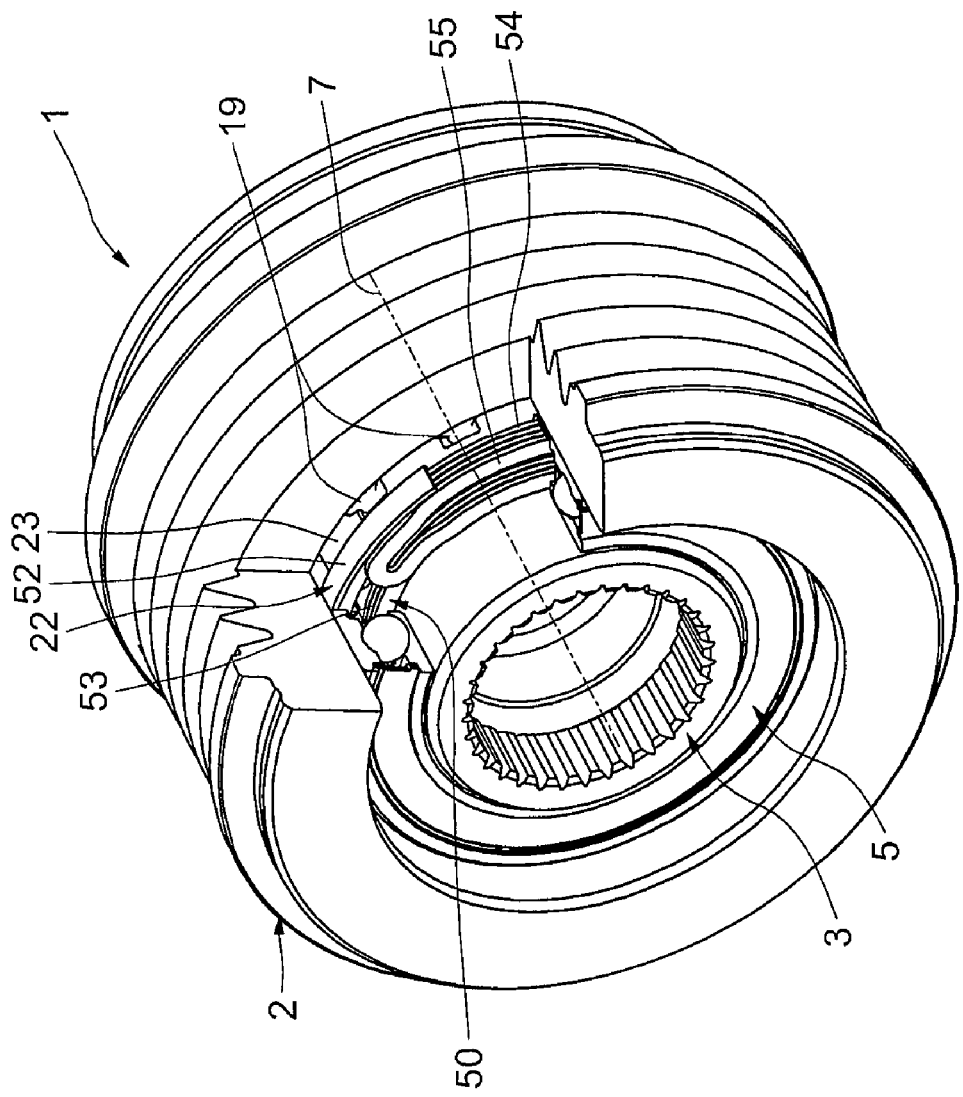
FIG. 7 is a perspective view of the device seen in FIG. 6.

The embodiment illustrated in FIGS. 6 and 7, in which identical parts are given identical references, differs in that the free wheel 6 includes an elastic connecting member 50 which takes the form of a spring having rectangular-section double-wound helical turns.

The connecting member 50 is mounted here axially and radially inside the cage 22. Specifically, in this embodiment, the cage 22 includes a radial portion 51 that is a radially outward continuation of an axial end of the portion 23 situated alongside the rolling-contact bearing 5, towards the bore 2c of the pulley, stopping short of the latter. The cage 22 also includes an annular axial portion 52 that extends axially, from a large-diameter free edge of the radial portion 51, towards the outer ring 14 of the rolling-contact bearing 5.

The connecting member 50 is situated radially between the outer surface 3a of the internal transmission element 3 and the axial portion 52, and axially between the radial portion 51 and the free end of the axial portion 52.

The connecting member 50 is provided with a first fixing part 53 in the form of a series of helical turns, of which there are three in the present case, which are fitted onto the outer surface 3a of the internal element 3; a second fixing part 54 also in the form of a series of helical turns, of which there are three in the present case, which are fitted on the inside of the axial portion 52; and a working part 55 connecting together the two fixing parts 52 and 53.

The working part 55 consists of: a helical turn or a portion of a helical turn which is a continuation of the first fixing part 53 and has a winding diameter greater than said part so as to be wound around the outer surface 3a of the internal transmission element, at a distance from the latter; a helical turn or a portion of a helical turn that is a continuation of the second fixing part 54 and has a winding diameter smaller than said part in such a way as to be situated at a distance from the axial portion 52; and a loop connecting said helical turns together. The direction of winding of the helical turns reverses at the loop. The helical turn coming from the first fixing part 53 extends around an angle of between 180° and 270°. The helical turn coming from the second fixing part 54 has a circumferential dimension contained within the same angle.

In other words, the working part 55 is configured in such a way that a first portion coming from the first fixing part 53 radially encircles the outer surface 3a of the internal element 3, leaving a radial gap between it and said surface which increases in a first circumferential direction towards a linking loop, and a second portion connected to the loop radially encircles the first portion, leaving a radial gap between said portions which increases in a second circumferential direction opposite to the first direction as far as the second fixing part 54.

The free wheel is provided with a moving part forming a means of creating a return torque on the cage.

In an application to a drive pulley for a motor vehicle alternator, by means of the free wheel, the pulley drives the central shaft when the engine is accelerating or is running at a more or less steady speed or even decelerating very slowly. If the engine, and therefore the pulley, slow suddenly, the central shaft of the disengageable pulley device can continue to rotate more rapidly than the actual pulley because of the free wheel, which thus prevents excessive stresses being applied to the drive belt. Furthermore, the free wheel allows a virtually instantaneous transition from free-wheeling operation to torque-transmitting operation and shows continuing good reliability over time owing in particular to the very low wear of the cams on the raceways.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. Disengageable pulley device comprising a pulley mounted on an internal transmission element, and a free wheel designed to provide one-way engagement between the pulley and the internal transmission element, the free wheel being provided with a plurality of wedges, with a cage for the wedges and with a spring tending to keep the wedges in contact with raceways of the pulley and of the internal transmission element, the device further comprising an elastic connecting member provided with a first fixing part for fixing it to the internal transmission element, with a second fixing part for fixing it to the cage, and with a working part between said fixing parts, said working part being radially moveable relative to the internal transmission element and being adapted to exert a circumferential return force on the cage.

2. Device according to claim 1, wherein the working part of the connecting member is situated at a distance from the internal transmission element in a rest position.

3. Device according to claim 1, wherein the working part of the connecting member radially encircles the internal transmission element.

4. Device according to claim 1, wherein the working part of the connecting member is circumferentially continuous.

5. Device according to claim 1, wherein the working part of the connecting member comprises at least one helical turn.

6. Device according to claim 1, wherein the first part is mounted inside a hole formed in the internal transmission element.

7. Device according to claim 1, wherein the first fixing part comprises at least one helical turn wound tightly onto the internal transmission element.

8. Device according to claim 1, wherein the second fixing part is fixed to a radial portion of the cage.

9. Device according to claim 1, wherein the second fixing part is fixed to an axial portion of the cage.

10. Device according to claim 9, wherein the elastic connecting member is in the form of a double-wound spring with helical concentric turns, the direction in which the turns of the spring are wound being reversed at a loop connecting the two windings together.

11. Device according to claim 1, comprising a single cage for the wedges.

12. Device according to claim 1, further comprising at least one elastic return element mounted between at least one wedge and the cage.

13. Alternator comprising a shaft and a disengageable pulley device according to claim 1, mounted on said shaft.

* * * * *

UNITED STATES PATENT AND TRADEMARK OFFICE
CERTIFICATE OF CORRECTION

| | | |
|---|---|---|
| PATENT NO. | : 7,988,576 B2 | Page 1 of 1 |
| APPLICATION NO. | : 12/054962 | |
| DATED | : August 2, 2011 | |
| INVENTOR(S) | : Descombes et al. | |

It is certified that error appears in the above-identified patent and that said Letters Patent is hereby corrected as shown below:

Title Page:

Please insert:

--(30) Foreign Application Priority Data:

March 26, 2007 (FR).......... 0754038--

Signed and Sealed this
Fourth Day of October, 2011

David J. Kappos
*Director of the United States Patent and Trademark Office*